3,360,478
LASER ACTION FLUORINATED EUROPIUM
CHELATE DISSOLVED IN ACETONITRILE
Erhard J. Schimitschek and Richard B. Nehrich, Jr., San Diego, and John A. Trias, La Mesa, Calif., assignors to the United States of America as represented by the Secretary of the Navy
Filed Dec. 14, 1964, Ser. No. 418,358
3 Claims. (Cl. 252—301.2)

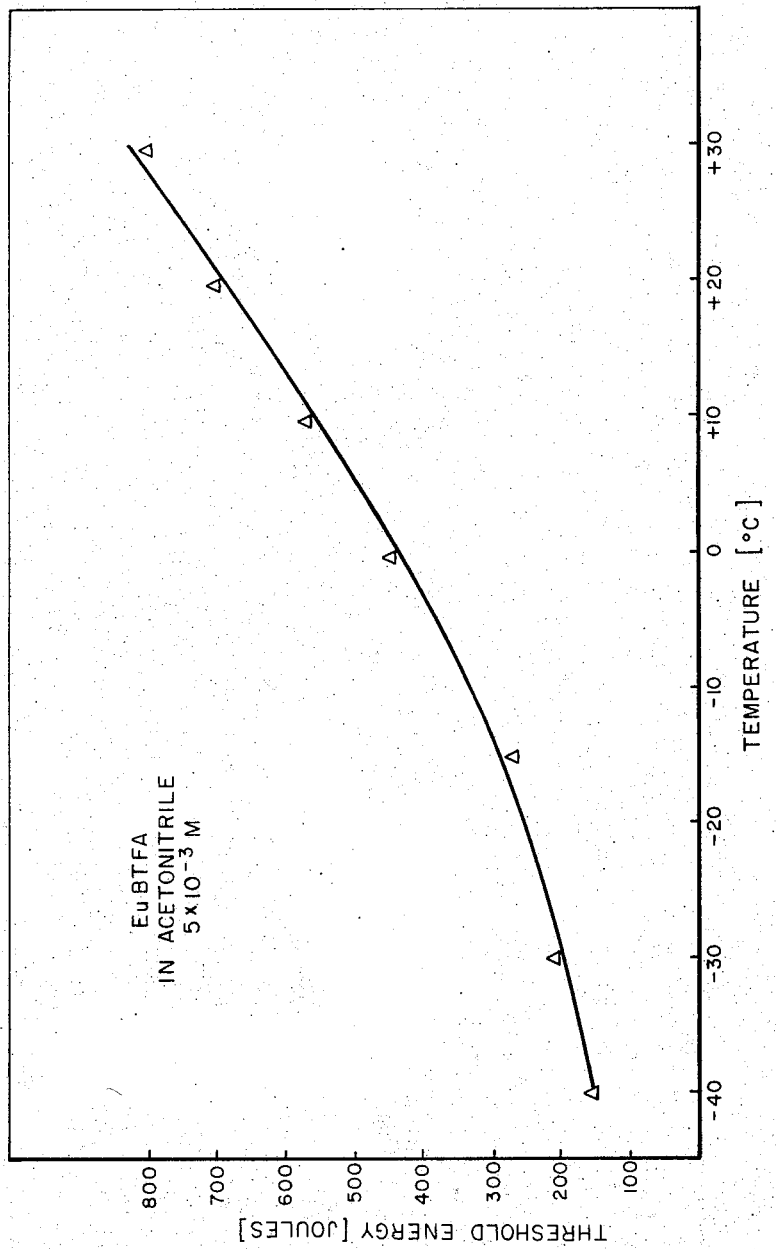

ABSTRACT OF THE DISCLOSURE

A liquid lasing solution is provided which, when contained in an appropriate laser cell and maintained at a temperature near room temperature, is capable of emitting a laser beam upon being pumped by a light source. The solution is a fluorinated europium chelate dissolved in acetonitrile, the chelate being in a tetrakis form which includes an amine base.

---

The invention described herein may be manufactured and used by or for the Government of the United States of America for governmental purposes without the payment of any royalties thereon or therefor.

The present invention relates to liquid lasing solution formed with europium chelates.

The lasing capacity of europium chelates dissolved in an alcoholic solution of ethanol and methanol has been clearly demonstrated and described in the literature. However, the use of the alcoholic solvents, or their equivalents, has presented several serious problems, paramount among which is the fact that the freezing point of the solutions usually is quite low in the neighborhood of −150° C. Since the optical properties of most materials are strongest near the freezing point, and also since light scattering at the freezing point is at a minimum, it has been necessary to reduce the temperatures of the solutions to about −150° C., at which temperature the solution is extremely viscous with very low flowability.

For a number of reasons, it is far preferable to provide a lasing solution which is capable of exhibiting stimulated light emission or, in other words, lasing action at or near room temperature. Obviously, the economic and practical advantage inherent in avoiding the previously required super-cooling is a significant consideration. In addition, a liquid which lases essentially at room temperature is a true liquid with adequate flowability so that, if desired, it can be recirculated to and from the lasing head for re-use. For example, as may be known, certain laser heads employ a quartz capillary cell and the liquid lasing solution is placed between mirrors in the capillary tube where it is excited with a xenon flash lamp to obtain the desired light emission. One such laser head is fully described in a co-pending application filed December 10, 1962, Ser. No. 329,593, "Liquid Laser Cell" in the names of Erhard J. Schimitschek and Edward R. Schumacher. Other similar laser heads are described elsewhere in the literature. If such a laser head were to be used, the room temperature lasing solution can be pumped after each event from the capillary tube, re-cooled in a heat-exchanger, and returned to the tube for use-use. In the case of the europium chelate dissolved in an alcoholic solvent, the liquid is entirely too viscous for practical recirculation.

Another difficulty with the formerly-used alcoholic solvent has been the tendency of the solvent to interact with the chelate in such a way that the laser action stopped after a few days and could not be achieved at all. The instability of such solution clearly is undesirable in that it seriously limits the shelf life of the material. Also, the lasing action appears to be dependent upon the use of appropriate amine bases in the formation of the chelate itself.

It is, therefore, an object of the present invention to provide a liquid lasing solution capable of demonstrating stimulated light emission at or near room temperature.

More specifically, another object is to provide a solution capable of demonstrating stimulated light emission within the temperature range of −40° to +30° C.

Another object is to provide a liquid lasing solution having a relatively long shelf life in that it does not deteriorate and lose its lasing capacity within a period of a few days.

A further object is to provide a liquid lasing solution formed of an europium chelate in which the stimulated light emission of the chelate solution is essentially unaffected by the selection of the amine base used in forming the chelate itself.

Other objects and their attendant advantages will become apparent in the ensuring description.

The objects of the invention essentially are achieved by providing a liquid lasing solution of a fluorinated europium chelate dissolved in acetonitrile.

Stimulated emission has been demonstrated utilizing a number of fluorinated europium chelates including Euthenoyltrifluoroacetonate (Eu-TTA), Eu-trifluoracetylacetonate, (Eu-TFAA) and Eu-benzoyltrifluoracetonate (Eu-BTFA). By dissolving these chelates in acetonitrile, stable liquid lasing solutions operative within a temperature range of −40° C. to about 30° C. were prepared. Their stability was apparent from the fact that no change in the fluorescent spectrums could be observed after an observation period exceeding five weeks. As previously stated, other europium chelates dissolved in alcoholic solvents undergo significant change in the fluorescent spectrum within a period of only a few days.

The chelates all were prepared in the usual way, or, in other words, by dissolving the respective chelate agent (TTA, TFAA and BTFA) with europium chloride ($EuCl_3$) and with an appropriate amine base in ethanol in a molar ratio of 4:1:4. The resulting crystalline precipitate was washed and air dried. Chemical analysis performed on some of the chelates indicated that the prepared materials belong to the general class Eu(ligand)$_4$H base. Apparently, as far as could be observed, the amine base used in preparing the chelate had no effect upon the lasing capacity of the solution. In other words, any of the amine bases such as dimethylamine, ammonia, imidazole, pyrrolidine, etc., can be employed interchangeably with the chelating agent and the europium chloride. In making such substitutions of amine bases, no appreciable shift in laser wavelength was demonstrated.

Some of the chelates formed were Eu(TTA)$_4$HDMA (DMA for dimethylamine), melting point 194–195° C.; Eu(TFAA)$_4$ HNH$_3$, melting point 191–192° C.; Eu(BTFA)$_4$HI (I for imidazole), melting point 194–195° C.; Eu(BTFA)$_4$HPyrr (Pyrr for pyrrolidine), melting point 212–213° C.

The chelates formed with the amine bases DMA, NH$_3$ and I were dissolved in acetonitrile, the concentrations being $5 \times 10^{-3}$ m.) $10^{-2}$ m., and $7.5 \times 10^{-3}$ m., respectively. Also, the chelate formed with the amine base Pyrr was dissolved in acetonitrile to a concentration of $5 \times 10^{-3}$ m.

Each of these solutions individually was transferred to a capillary laser cell of the type previously identified and, upon excitation of the cell, stimulated laser emission was clearly demonstrated. As to the first three solutions (Eu-TTA, Eu-TFAA and Eu-BTFA formed with imidazole) the excitation of the cell was accomplished at −35° C.; the laser wavelengths, measured on a Jarrell-Ash. .75 m. spectrograph, were determined to be Eu-TTA 6,125 A.; Eu-TFAA 6,119 A.; and Eu-BTFA 6,118 A. A threshold pump energy of about 800 joules was employed and, as already indicated, all three solutions showed spiking, line narrowing and beam collimation. It is particularly important to note that, since the operative temperature was −35° C., the previously-required cooling utilizing liquid nitrogen vapor was not necessary and, instead, the cooling could be accomplished by the use of dry air, pre-cooled in an alcohol/Dry Ice bath; the dry air, of course, being passed around the laser cell.

Further testing was performed using the solution Eu(BTFA) formed with the amine base pyrrolidine, this testing being carried out in essentially the same manner to the extent that the solution was placed inside the same capillary tube laser head. The fluorescence output of this liquid also showed typical laser phenomena, such as spiking, line narrowing, and beam collimation. The laser wavelength was found to be 6,118 A. which, as will be noted, conforms with the laser wavelengths of the Eu-BTFA formed with imidazole. However, rather than limiting the operating temperature of the cell to the previous −35° C., various temperatures were employed. More specifically, the operation temperatures shown in FIG. 1 were used and stimulated emission was observed between a temperature range of −40° C. to +35° C. Apparently, the temperature limits of the liquid are determined by the freezing point on one side (about −46°) and by the increased tendency for bubble formation inside the laser tube on the other side. FIG. 1 further shows the manner in which the threshold energy in joules varies with the variation in operation temperature.

Further tests were made to determine the relationship between the threshold energy and the concentration of the solution. In general, these tests established a minimum concentration necessary for laser action and this minimum concentration was $1.5 \times 10^{-3}$ m., or $9 \times 10^{17}$ molecules/cm.$^3$. This number agrees quite closely with the theoretical value which may be calculated from the Schawlow-Townes formula.

It consequently should be apparent that a fluorinated europium chelate dissolved in acetonitrile is capable of providing room temperature liquid lasers of the type, which, as previously explained, can be recirculated through a laser cell to permit a substantially continuous laser action by re-use of the same solution. Also, the liquids were quite stable and apparently the manner in which the chelates themselves are prepared makes no difference insofar as resulting laser wavelengths are concerned.

Obviously many modifications and variations are possible in the light of the above teachings. It is intended to cover all changes and modifications of the embodiments set forth herein which do not constitute departures from the spirit and scope of the invention.

What is claimed is:

1. A liquid lasing solution consisting essentially of a chelate dissolved in acetonitrile to a minimum concentration of $9 \times 10^{17}$ molecules per centimeter cubed,
    said chelate being selected from a group of fluorinated europium chelates consisting of members characterized by a physical structure in which said europium ion is ligated to four fluorinated diketone groups and an amine base, and
    said solution being capable of exhibiting stimulated light emission within a temperature range of −40° C. to +30° C.

2. The liquid lasing solution of claim 1 wherein said diketone is selected from a group consisting of thenoyltrifluoroacetone, trifluoroacetylacetone, and benzoyltrifluoracetone.

3. The liquid lasing solution of claim 1 wherein said diketone is benzoyltrifluoroacetone.

References Cited
UNITED STATES PATENTS
3,225,307  12/1965  Weissman _____ 252—301.2

TOBIAS E. LEVOW, Primary Examiner.

ROBERT D. EDMONDS, Examiner.